(12) United States Patent
Roeseler et al.

(10) Patent No.: US 7,170,284 B2
(45) Date of Patent: Jan. 30, 2007

(54) BLADE DETECTION SENSOR HAVING AN ACTIVE COOLING SYSTEM

(75) Inventors: Corydon C. Roeseler, Hood River, OR (US); Andreas H. Von Flotow, Hood River, OR (US); Benjamin Lewit, Hood River, OR (US)

(73) Assignee: Hood Technology Corporation, Hood River, OR (US)

( * ) Notice: Subject to any disclaimer, the term of this patent is extended or adjusted under 35 U.S.C. 154(b) by 1 day.

(21) Appl. No.: 11/156,921

(22) Filed: Jun. 20, 2005

(65) Prior Publication Data

US 2005/0280412 A1 Dec. 22, 2005

Related U.S. Application Data

(63) Continuation-in-part of application No. 10/354,616, filed on Jan. 29, 2003, now Pat. No. 6,927,567.

(60) Provisional application No. 60/356,932, filed on Feb. 13, 2002.

(51) Int. Cl.
*G01B 7/30* (2006.01)
*G01R 33/00* (2006.01)

(52) U.S. Cl. .................. 324/207.25; 324/260
(58) Field of Classification Search .......... 324/207.25, 324/260
See application file for complete search history.

(56) References Cited

U.S. PATENT DOCUMENTS

| | | | |
|---|---|---|---|
| 3,065,412 A | 11/1962 | Rosenthal | |
| 3,652,195 A * | 3/1972 | McIntosh et al. | 431/21 |
| 3,932,813 A | 1/1976 | Gallant | |
| 4,070,883 A * | 1/1978 | Kunz et al. | 72/11.1 |
| 4,439,728 A | 3/1984 | Rickman, Jr. | |
| 4,678,992 A | 7/1987 | Hametta | |

(Continued)

OTHER PUBLICATIONS

Tappert et al., Monitoring blade passage in turbomachinery through the engine case (no holes), Aerospace Conference Proceedings, 2002 IEEE, vol. 6, Iss., 2002, pp. 6-3125 6-3129.

*Primary Examiner*—Bot LeDynh
(74) *Attorney, Agent, or Firm*—Bell, Boyd & Lloyd LLC (57) ABSTRACT

A passive blade detection sensor exploits the electrically conductive trait of typical turbo machinery components such as fan, compressor and turbine blades. A permanent magnet is placed strategically adjacent to a wire coil to generate a single pulse/antipulse signal when a blade passes in front of the sensor. The electrically conductive blade allows eddy currents to flow briefly as it passes through the magnetic field, the local reluctance is momentarily increased, and the magnetic field is momentarily changed. The coil is sensitive only to the portion of change through its cross section, so that a simple voltage pulse, useful for precise timing of blade passage, is produced. The present disclosure also describes an open-loop and closed-loop active cooling system. The cooling system includes a casing, having internal sensing components and an inlet, coupled to one end of the casing. A cooling medium is transferred from the inlet into the casing, where the inlet is arranged to cause the cooling medium to travel around the components. An outlet is coupled to another end of the casing, where the outlet is arranged to direct cooling medium out of the casing. The cooling medium may flow freely or through a predetermined path within the casing.

36 Claims, 11 Drawing Sheets

U.S. PATENT DOCUMENTS

| | | |
|---|---|---|
| 4,841,243 A | 6/1989 | Bishop et al. |
| 4,847,556 A | 7/1989 | Langley |
| 4,956,606 A | 9/1990 | Kwiatkowski et al. |
| 4,967,153 A | 10/1990 | Langley |
| 5,015,949 A | 5/1991 | Koch et al. |
| 5,046,468 A * | 9/1991 | Erhard .................. 123/406.54 |
| 5,097,711 A | 3/1992 | Rozelle et al. |
| 5,373,234 A | 12/1994 | Kulczyk |
| 5,381,090 A | 1/1995 | Adler et al. |
| 5,767,402 A * | 6/1998 | Sandlass et al. ............... 73/779 |
| 5,942,893 A | 8/1999 | Terpay |
| 6,125,706 A * | 10/2000 | Buttram et al. ................ 73/643 |
| 6,140,727 A | 10/2000 | Goto et al. |
| 6,170,148 B1 | 1/2001 | Van Den Berg |
| 6,384,595 B1 | 5/2002 | Ito et al. |
| 2002/0180426 A1* | 12/2002 | Schroeder et al. ..... 324/207.22 |
| 2003/0096673 A1* | 5/2003 | Ezure et al. .................. 477/80 |

* cited by examiner

BLADE DETECTION SENSOR HAVING AN ACTIVE COOLING SYSTEM

PRIORITY CLAIM

This application is a continuation-in-part of U.S. patent application Ser. No. 10/354,616 filed on Jan. 29, 2003, now U.S. Pat. No. 6,927,567 which claims priority to U.S. provisional patent application 60/356,932, filed Feb. 13, 2002, the entire contents of both of which are incorporated herein.

FIELD OF TECHNOLOGY

The present invention relates to a sensing device for the detection of passing blades in turbo-machinery and a cooling system for maintaining lower temperatures in the environment surrounding the sensing device in turbo-machinery.

BACKGROUND

The detection of passing turbo machinery blade length (or tip clearance) and time of arrival is commonly performed using light probes, capacitive sensors, and eddy current sensors.

Passive eddy current sensors generally use permanent magnets and behave like small electrical generators. Relatively minute quantities of power are drawn from the spinning turbo machinery, so there is no need for an external power source specifically for the sensor. The magnetic reluctance of non-ferrous alloys commonly found in engine case walls, such as titanium and nickel is typically very close to that of air. Hence, there is no need to drill through-holes in the case wall, as with other types of sensors. The eddy current sensor described as the present invention sees through the wall, and many other types of debris, such as unburned fuel, ice, oil, or water, which may also be in the vicinity.

Figure 2:
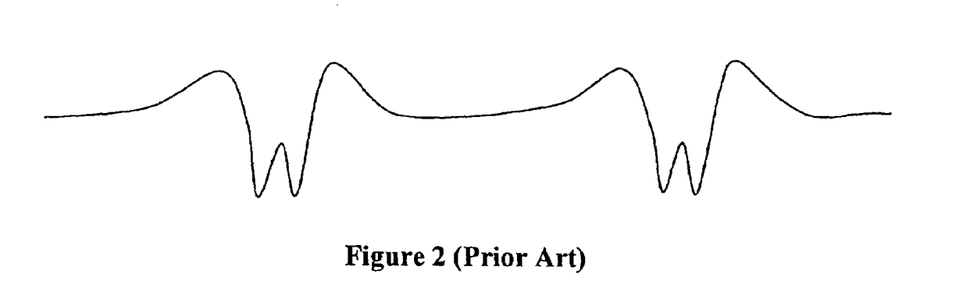
FIG. 2 shows a signal generated by two blades passing by devices according to the prior art.
Figure 3:
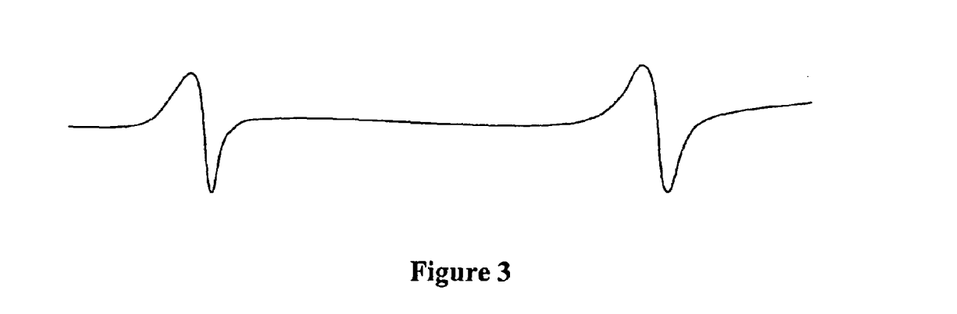
FIG. 3 shows an exemplary signal generated by two blades passing by according to the embodiment of FIG. 1a–b.

Passive eddy current blade sensing devices have been designed with one or more coils wound directly around one or more magnets, as Langley discloses in his 1989 patent "Eddy Current Clearance Transducing System" (U.S. Pat. No. 4,847,556) and again in his 1990 patent "Eddy Current Turbomachinery Blade Timing System" (U.S. Pat. No. 4,967,153). Langley describes an alternative design with the placement of a coil between two magnets. L. A. Rosenthal discloses a "Metal Detector" as a coil wound around a magnet in his 1962 patent (U.S. Pat. No. 3,065,412). However, the signal generated by these techniques usually includes complex features, such as double pulses, as depicted in FIG. 2 of the present application. The complex features of the pulse make it difficult to reliably measure tip clearance and time of arrival. A trigger threshold may be set at a value that results in a sporadic time of arrival reading that alternates between the leading peak and the trailing peak. The signal amplitude of a passive eddy current sensor usually varies with RPM and gap, hence triggering will occur on different parts of the blade at different speeds. Conversely, a signal processor easily and reliably triggers on the simple pulse generated by the present disclosure. This preferred pulse shape is depicted in FIG. 3 of the present application, and is discussed in greater detail below.

Several types of active eddy current sensors are currently available with two or more coils. One coil is driven with a time varying excitation voltage in the 1 kHz–1 MHz range. A second coil monitors changes in the magnetic field when electrical conductors are in the vicinity. There is no need for a permanent magnet, and one can use this type of sensor on a smooth shaft (no need for passing blades). However, the electronics and signal processors are much more complicated for this type of device, and the excitation frequency must be sufficiently high to detect the turbo-machinery blades passing in the 10–100 kHz range. GDATS and Microepsilon are two examples of active eddy current sensors with excitation frequencies sufficiently fast to detect passing turbo-machinery blades at normal operating speeds.

Rozelle et al. describes a system for monitoring shrouded blades in his 1992 patent "Shrouded Turbine Blade Vibration monitor and Target Therefor" (U.S. Pat. No. 5,097,711). However Rozelle's only references to the specific sensing devices cite the Bentley Nevada Proximitor and the "Self generating permanent magnetic sensors (e.g., Airpax sensors)." Bentley Proximitors have an excitation voltage and a frequency response of only 12 kHz. They are too slow to detect many modern turbomachinery blades, which pass a stationary sensor at up to 100 kHz. Airpax sensors have a wire coil wound on a ferro magnetic core, but the coil is placed between the magnet and the passing blades (ferrous gear teeth in most cases). This configuration is convenient for detecting the passage of ferromagnetic objects passing by the probe tip, however the magnet is placed too far from the passing blades for it to be of practical use with non-ferromagnetic blades commonly found in turbomachinery. Furthermore, the weak signal produced would have a double peak as in Rosenthal.

Rickman Jr. describes a Motion Sensor Utilizing Eddy Currents for non-ferrous blades through non-ferrous case wall materials (U.S. Pat. No. 4,439,728). However, his design calls for a relatively large magnet placed far from the sensing coil. This may be useful as a tachometer, however advanced blade vibration monitors will require a more compact probe capable of more precisely determining blade deflection relative to a single fixed point on the engine case wall. One embodiment of the present disclosure provides this feature by placing the bias magnet and pickup coil in the same barrel at the same mounting location.

Another issue with sensors is the heat generated in the surroundings of a sensor. Since sensors, and particularly blade sensors, are often located near turbo-machinery, this environment may generate significant amounts of heat, and in turn affect sensor performance. Accordingly, a cooling system is needed for reducing or maintaining the internal temperature of such sensors.

BRIEF SUMMARY

The present application discloses a blade detection device comprising a permanent magnet; a wire coil placed adjacent to the magnet, where the permanent magnet and the wire coil placed adjacent to the permanent magnet comprises a sensor; mounting hardware which positions said magnet and coil in close proximity to passing rotor blades; and leads with accessible terminations to facilitate a connection to electronics for monitoring blade time of arrival and/or blade tip clearance measurements.

In one exemplary embodiment, the coil is wound on a ferro-magnetic core; the coil and magnet are secured inside a protective barrel; and the magnet is placed adjacent to the coil and held at an angle such that a simple pulse is generated when a conductive blade passes by.

In an alternate embodiment, coil resistance is monitored for the detection of device temperature; a metallic shield is present between the sensor and the passing blades; the metallic shield is optimized in thickness and material, to reduce the signal amplitude sensitivity upon blade tip velocity; and the metallic shield is a closed end of a blind hole in the sensor.

In another alternate embodiment, a thermocouple wire is used to extend the coil leads to a remote connector; bias voltage of the thermocouple wire is monitored as a useful indication of device temperature; and the magnet is polarized in a direction that is parallel to a winding axis of the coil.

Also, in exemplary embodiments discussed below, an active cooling system is provided to reduce the internal temperature of a sensor such as an eddy current sensor to a temperature below the temperature of the sensor's surroundings. One such embodiment employs an open-loop system to control the temperature of the sensor, where the open-loop system includes a tube sized and configured to carry a cooling/heat transfer medium into the sensor. The tube exhausts the cooling medium into the sensor's environment.

Under an alternate embodiment, another open-loop system is disclosed, where a tube is sized and configured to carry a cooling/heat transfer medium to the sensor, and where the tube opens within the sensor case. The medium is moved throughout the case and is exhausted to the sensor's environment through a hole in the case.

Under another embodiment, a closed-loop system is disclosed, where a tube is sized and configured to carry a cooling/heat transfer medium to the sensor, and then to return the medium outside the turbo machinery with or without venting the medium directly to the sensor environment.

BRIEF DESCRIPTION OF THE DRAWINGS

The various objects, advantages and novel features of the present disclosure will be more readily apprehended from the following Detailed Description when read in conjunction with the enclosed drawings, in which.

DETAILED DESCRIPTION

The present application discloses a blade detection device that comprises a permanent magnet; a wire coil placed adjacent to the magnet; mounting hardware which positions the magnet and coil in close proximity to passing rotor blades; and termination of coil leads to facilitate a connection to electronics for the purpose of monitoring blade time of arrival and/or blade tip clearance measurements.

The following list of elements is used through most of this disclosure, particularly in FIGS. 1–8:
1. Coil
2. Core
3. Magnet
4. Connector
5. Pigtail
6. Potting compound
7. Barrel
8. Case wall
9. Shield
10. Rotor blades
11. Winding axis
12. Mounting hardware
13. Shrouded blades
14 Magnetic field The sensor includes a fine wire coil 1, wound onto a ferro-magnetic core 2. The coil assembly is placed adjacent to a magnet 3 that is polarized in a direction parallel to the winding axis of the coil 1. This combination of magnet, coil, and ferromagnetic return path form the functional elements of the sensor. Several variations in connector detail and mounting hardware 12 are anticipated.

In the embodiments disclosed herein, potting compound 6 is preferably used to secure the functional elements described above inside a protective barrel 7. The leads from the coil terminate at a connector 4 or a pigtail 5 at one end of the barrel 7. For high-temperature applications, the pigtail 5 may be shielded by a metallic conduit, and the connector 4 is placed far enough from the heat source, that conventional solder contacts or crimp connections may be used. If thermocouple wire is used for the pigtail 5, a bias voltage will report the difference between the temperature at the sensor and the temperature at the remote end of the pigtail 5 or connector 4. Under this embodiment, the passive eddy current sensor also functions as a temperature probe.

If the sensor does not penetrate completely through the case wall, the remaining thickness of material will act like a shield 9 between the sensor and the rotor blades 10. In most cases, this shield 9 has only the disadvantage of displacing the sensor farther from the rotor blades 10, provided that the shield material is not ferro-magnetic. For example, the placement of a 1/16" non-ferrous shield between the sensor and the passing blades usually results in 10–30% reduction of signal. By contrast, a 1/16" ferro-magnet shield attenuates the signal by 10,000%.

Common turbo-machinery features such as shrouded blades 13 are not critical to the present disclosure, since the flux lines pass through the smooth shroud and only become perturbed when blades pass through the field.

A metallic shielding material may also be added to make the passive eddy current sensor less sensitive to changes in blade velocity. This technique has the added benefit of thermal protection from the potentially hot gasses inside the engine, and the elimination of the possibility that sensor components may fall into the engine. One way to provide this metallic shield is to drill a blind hole in the sensor barrel. The remaining thickness of material at the bottom of the hole is the shield, and the open end provides access for the sensor leads or pigtail 5.

The barrel 7 may have external threads, a flange or other mechanical features to facilitate secure mounting into a boss or case wall 8. The eddy current sensor must be mounted securely to eliminate relative motion between the sensor and the turbo-machinery, especially in the case of the shielded sensor. Relative motion between the sensor and a vibrating engine case, for example, makes reliable blade detection more difficult.

The sensor is mounted with a prescribed angular orientation to maximize and correctly shape the electrical signal generated by passing blades 10. In the absence of blades 10, magnetic flux is directed through the end of the magnet 3. It continues an arc through space and flows freely through the ferro-magnetic core 2. When a conductive blade 10 passes quickly through the magnetic field, eddy currents form in the blade material, and the local magnetic field is perturbed. Flux lines shift to form a new magnetic field with a reduced energy state. The portion of this shift in magnetic field that penetrates the coil windings causes a voltage potential across the coil leads. Arranging for the blade to pass by the magnet 3 first, then the coil 1, can usually maximize and properly shape the resulting signal.

Relative blade length or tip clearances are monitored by careful calibration techniques. Since the signal varies with distance between the sensing elements (magnet and coil) and the passing blade, one can infer tip clearance from the pulse magnitude. Blade temperature, blade speed, blade geometry and blade material also effect pulse amplitude, and consideration of these parameters is required to maintain blade length calibration.

Magnet and coil materials are selected based on a list of design criteria including operating temperature, material cost, gap and size constraints. Smaller sensors placed further from a rotor blade generate smaller signals. A magnet material of high energy density such as Neodymium Iron Boron or Samarium Cobalt helps to increase signal amplitude. Also a fine wire gage allows a large number of turns around the core increasing signal amplitude. For high temperature applications, Alnico magnets and ceramic insulated magnet wire may be used. The coil leads may be extended with high temperature wire, so that a connector may be located far from the heat. In this case, thermocouple wire may be used, and the bias voltage reports sensor temperature. An inexpensive device may be constructed from coarse wire with enamel insulation, an alnico magnet, and a plastic connector soldered to the leads.

Figure 1A:
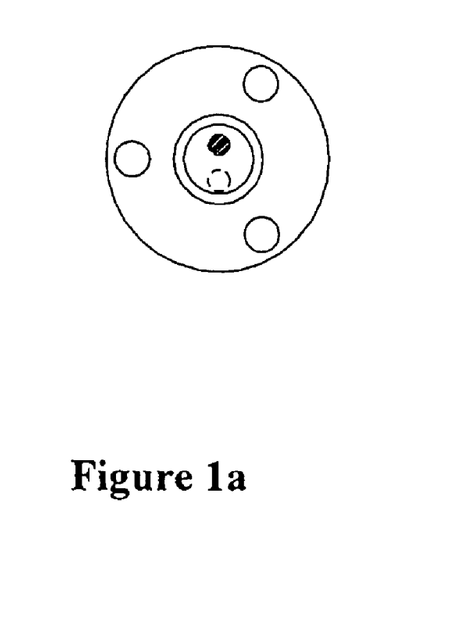
FIG. 1a illustrates an end view of an exemplary embodiment of a sensor, where a permanent magnet is placed beside an iron core.
Figure 1B:
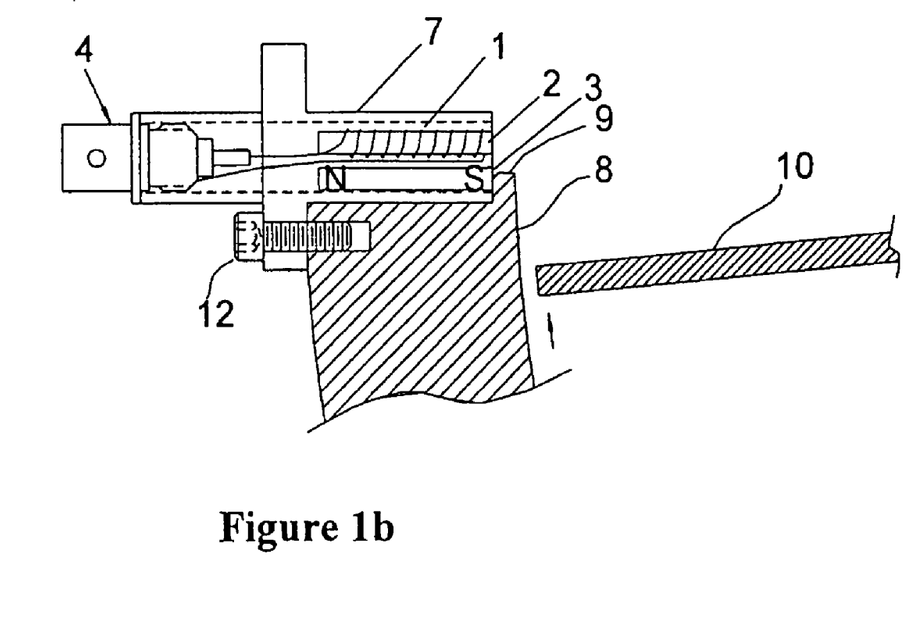
FIG. 1b illustrates a cut-away view of the embodiment of FIG. 1a, core 2 is shown with coil 1 wrapped around it.

With specific reference to the Figures, FIGS. 1a and 1b show a cut away view of a preferred embodiment of the present invention. The coil 1 is sketched with only ten turns for illustration purposes. In practice the fine wire makes several hundred turns around the core 2. The device is mounted with hardware 12 to an engine case wall 8 so that the blade passes the magnet first, then the coil. The case wall 8 is drilled from the outside with only blind holes, and the remaining shield 9 of case wall material remains between the sensor tip and the passing blade.

FIG. 2 is a voltage v. time trace for a typical passive eddy current sensor (Prior Art). Langley discloses this feature in his 1989 and 1990 patents (U.S. Pat. Nos. 4,847,556 and 4,967,153, respectively). The characteristic double peak appears when a blade passes. The double peak makes triggering difficult for signal processors.

FIG. 3 is a voltage v. time trace for the present invention. The single pulse and sharp falling edge make triggering easy.

Figure 4A:
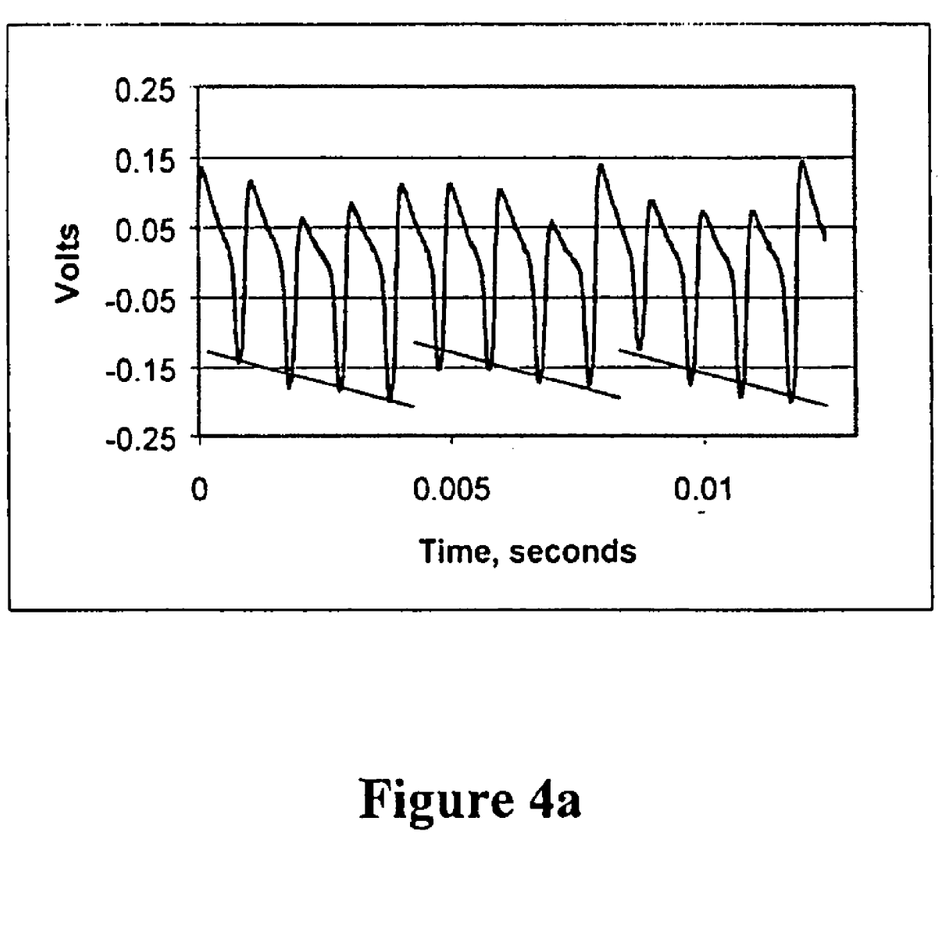
FIG. 4a is an exemplary time trace for one revolution of a bladed rotor with 12 blades.

FIG. 4a is the time trace for one revolution of a bladed rotor with 12 blades. The blade lengths are staggered in length by 0.0005 inches. The lengths of 3 groups of 4 blade lengths are observed, and a trend line is drawn to show signal v. blade length calibration with 0.0005-inch resolution.

Figure 4B:
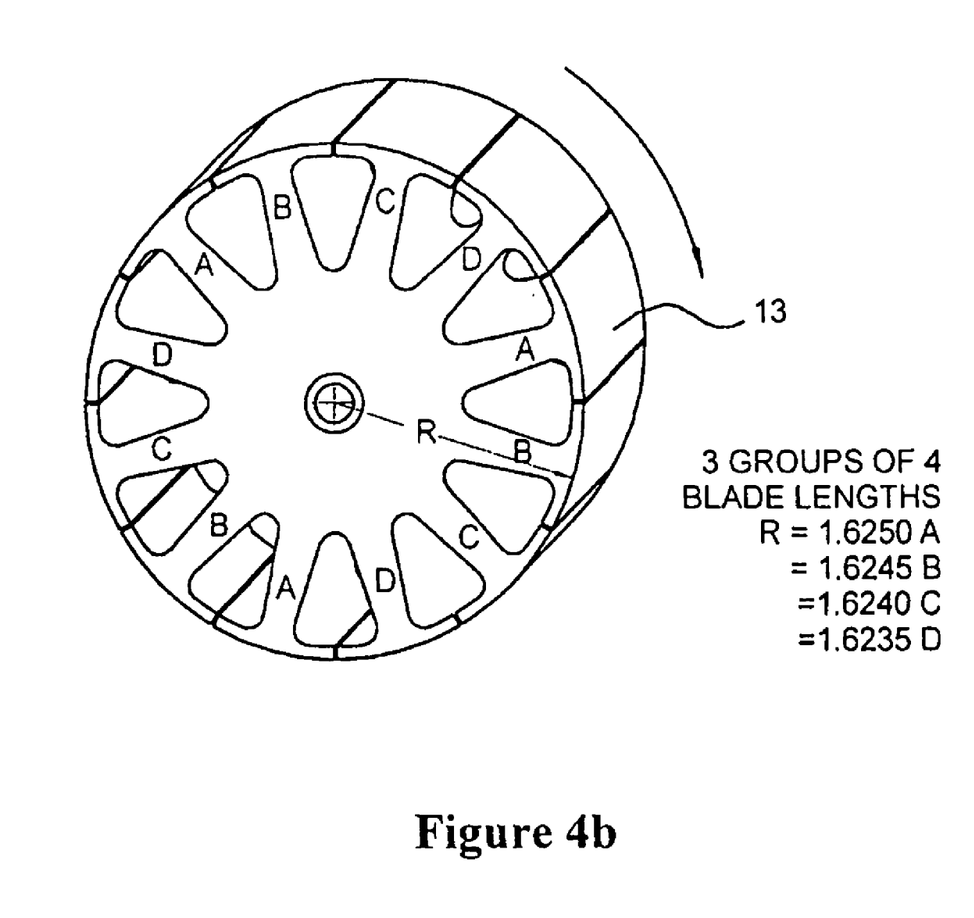
FIG. 4b illustrates a sample rotor with varying blade lengths and shrouded tips.

FIG. 4b illustrates the sample rotor with varying blade lengths and shrouded tips. More specifically, FIG. 4b shows the shrouded test rotor with 12 shrouded blades built to demonstrate sensor's ability to see through shrouds and resolve 0.0005-inch differences in blade lengths.

Figure 4C:
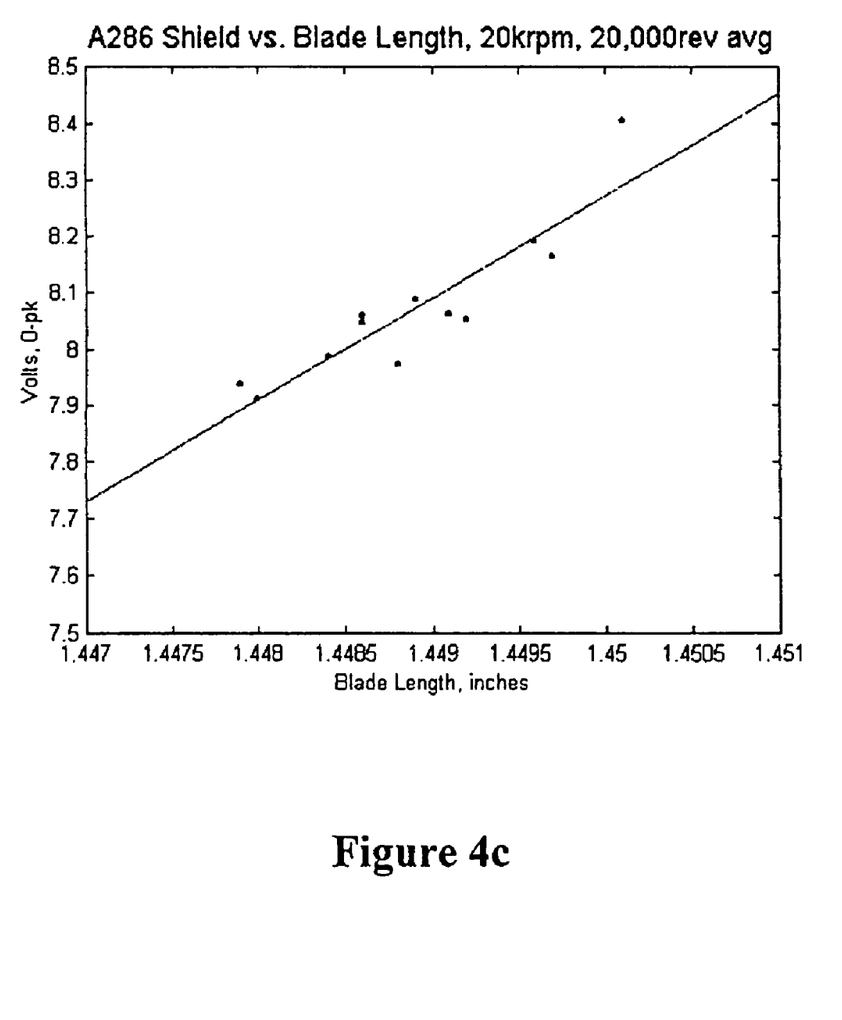
FIG. 4c shows peak voltage for each blade of an unshrouded version of the rotor plotted versus blade length, measured with a micrometer.

FIG. 4c shows peak voltage for each blade of an unshrouded version of the rotor plotted versus blade length, measured with a micrometer. The correlation fits a linear profile with better than 0.0005" resolution.

Figure 5A:
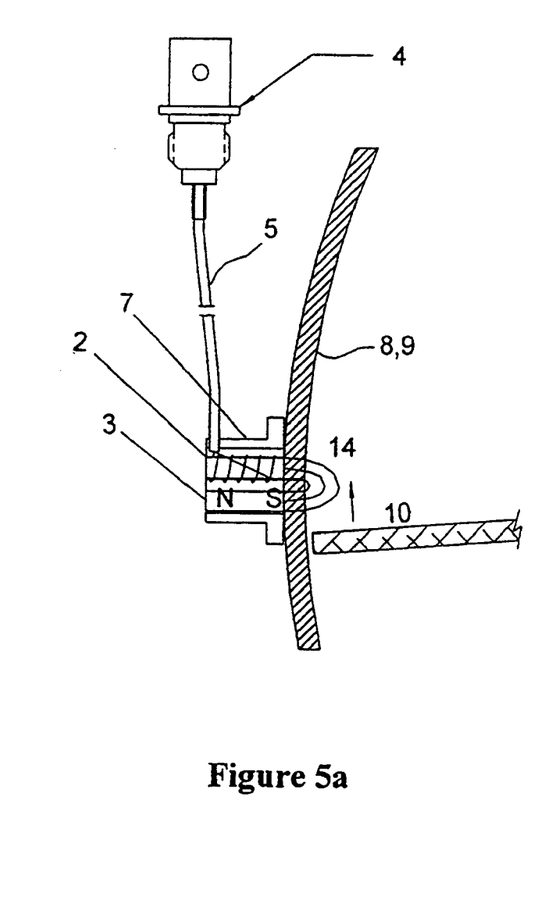
FIGS. 5a and 5b show alternative embodiments for high temperature applications where radial space may be limited as in the inner engine case of a gas turbine.
Figure 5B:
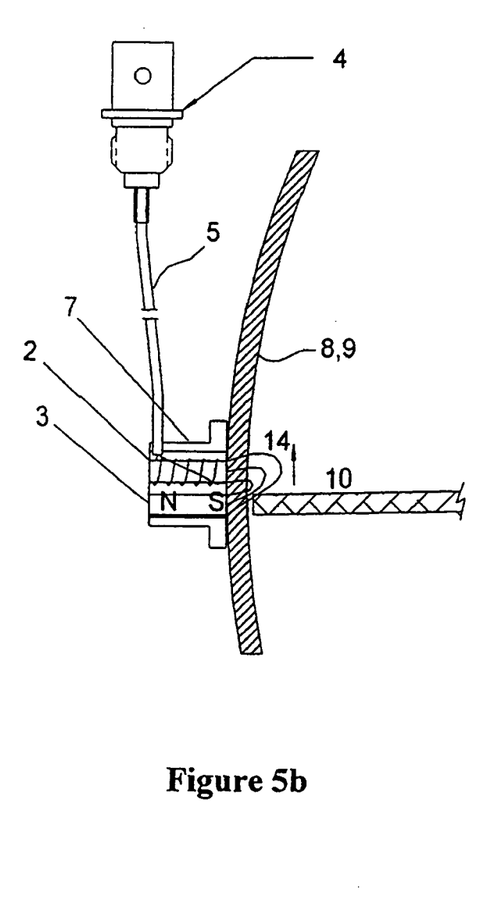

FIGS. 5a and 5b show an alternative embodiment for high temperature applications where radial space may be limited as in the inner engine case of a gas turbine. A pigtail may extend the leads to a cool region with stainless steel clad thermocouple wire. Alnico magnets and ceramic insulated wire may be required in temperatures exceeding 200 degrees F. The magnetic field 14 is shown undisturbed in FIG. 5a. Then in FIG. 5b, as the blade passes through the field at high speed, the field changes shape to minimize the energy state and an electrical pulse is generated by the coil.

Figure 6:
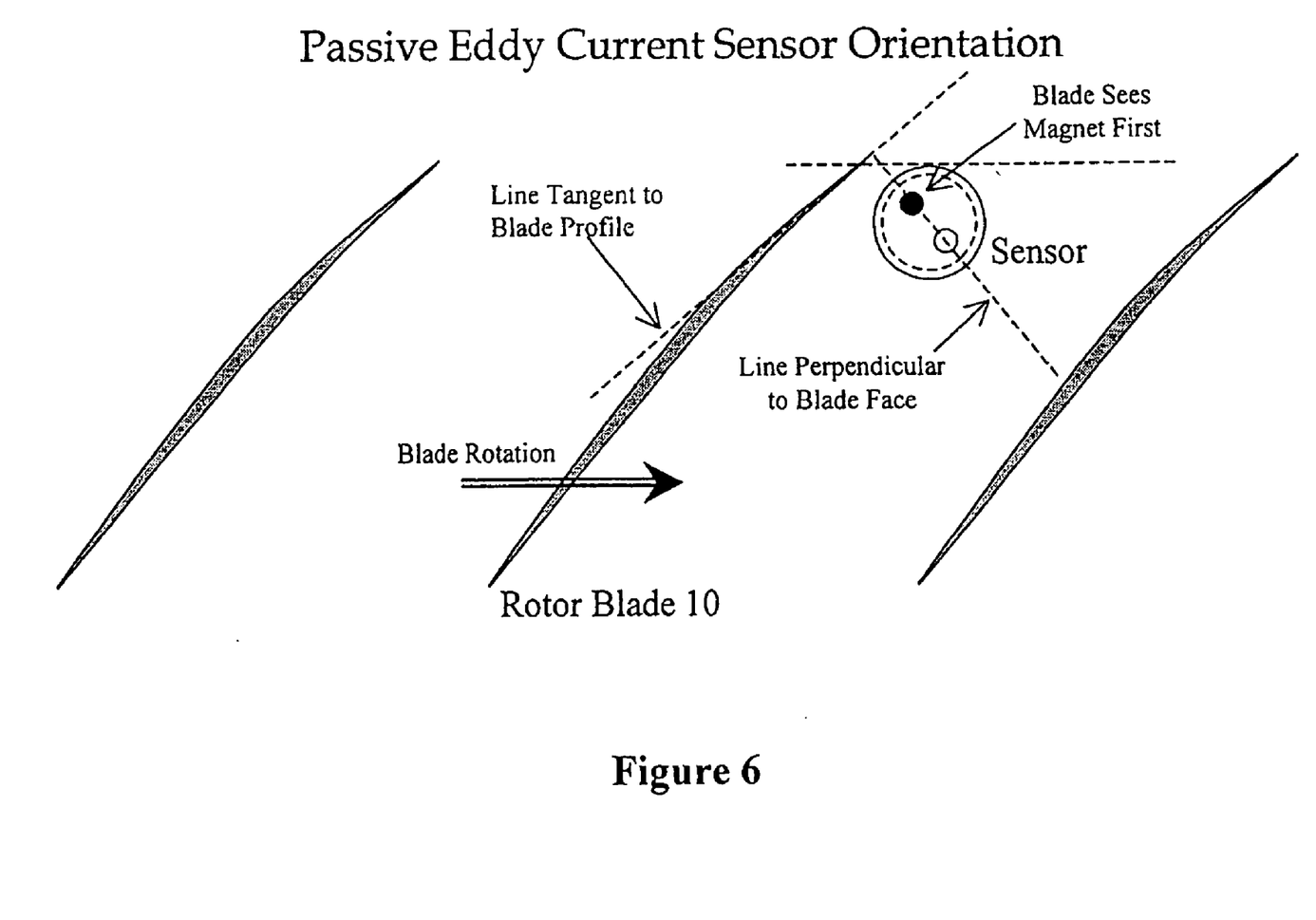
FIG. 6 illustrates an exemplary angular position of the sensor's magnet with respect to blade angle and trajectory.

FIG. 6 illustrates an optimal sensor orientation. The sensor should be oriented so that the blades pass the magnet before the core. Since the sense elements of the present invention is symmetric about only one axis in the end view, the device is sensitive to angular orientation with respect to blade angle and blade trajectory. FIG. 6 specifies the correct angular position of the sensor's magnet with respect to blade angle and trajectory.

Figure 7:
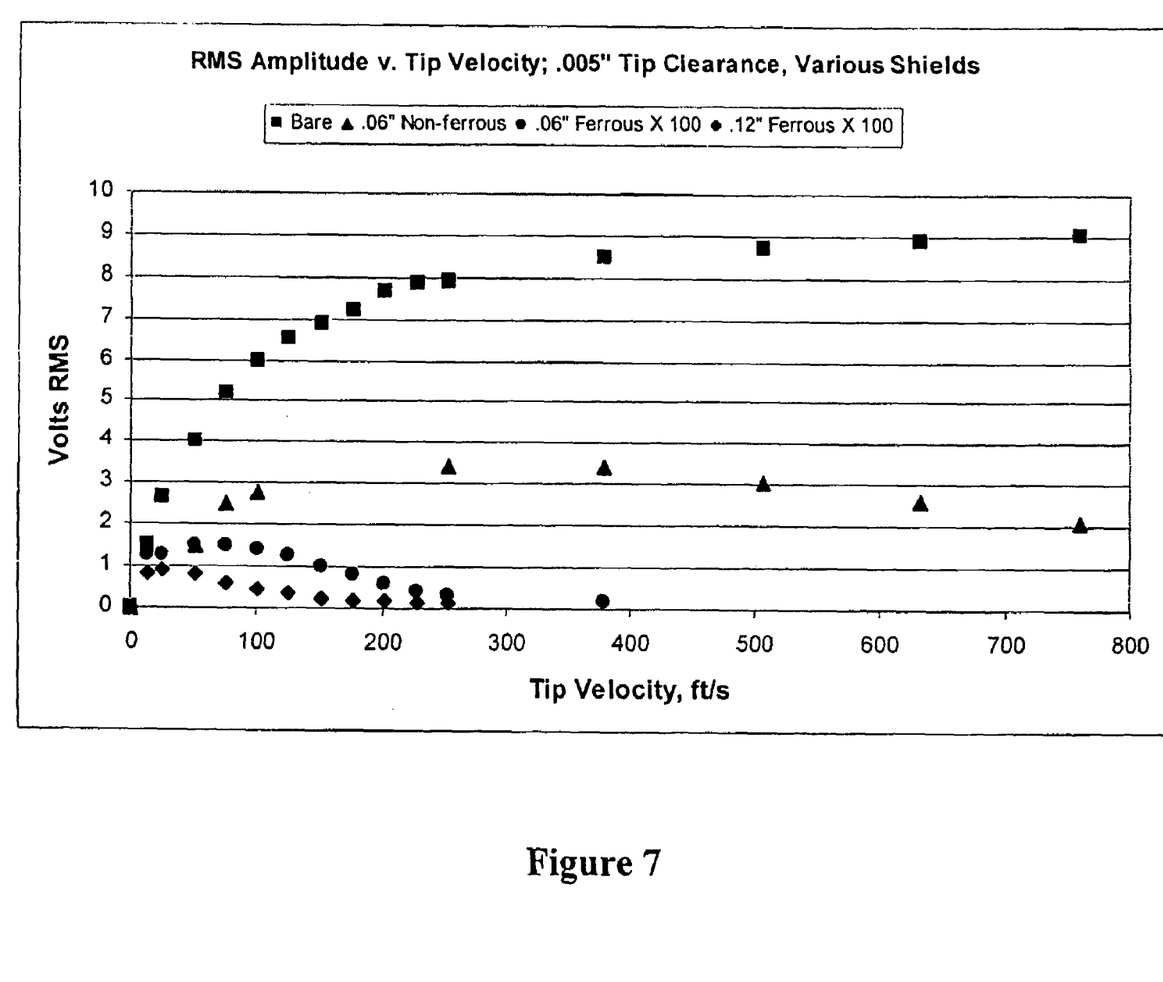
FIG. 7 illustrates RMS amplitude plotted versus tip velocity for a bare sensor, ferrous, and non-ferrous shields.

FIG. 7 illustrates how signal amplitude varies with blade tip velocity. The effect of shielding with ferrous and non-ferrous alloys is shown for tip velocities up to 800 ft/s.

Figure 8:
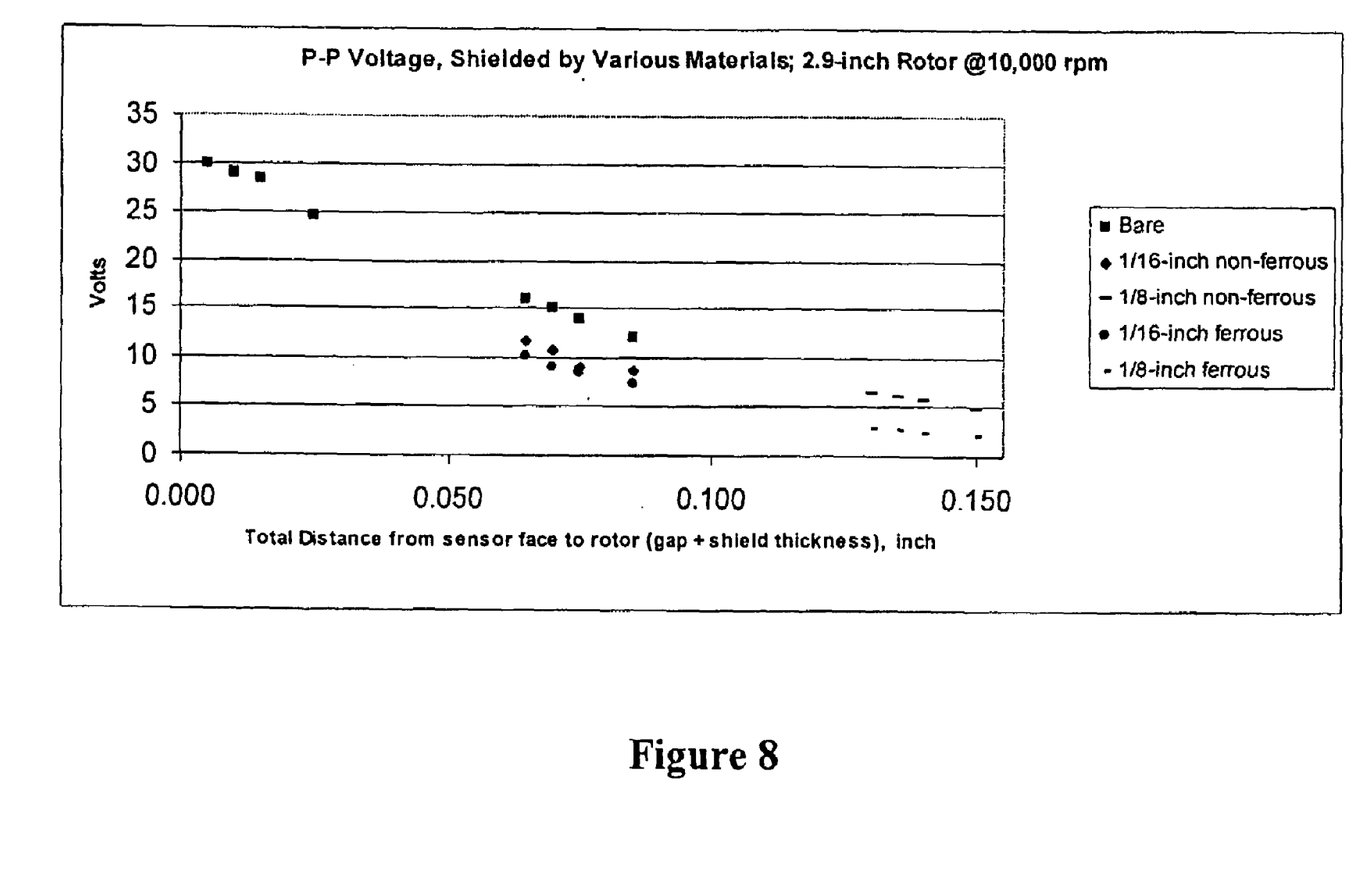
FIG. 8 illustrates signal amplitude plotted versus gap for a bare sensor, ferrous and non-ferrous shields of 1/16 and 1/8-inch thickness.

FIG. 8 shows signal amplitude plotted versus gap for a bare sensor, ferrous and non-ferrous shields of 1/16 and 1/8-inch thickness.

Figure 9:
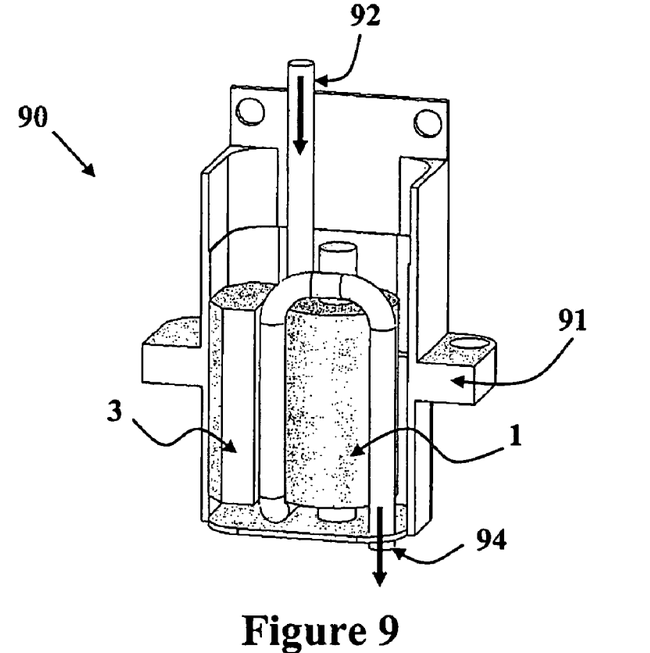
FIG. 9 illustrates a perspective view of a sensor of one exemplary embodiment wherein the sensor has a cooling system illustrated with the front of the case cut away to reveal a magnet, coil and a cooling tube, and where the tube enters the case, takes a serpentine path around the coil and exhausts to the front of the sensor.

Turning now to FIG. 9, the drawing illustrates a perspective view of a sensor 90, where a rectangular magnet 3 and cylindrical coil 1 are housed inside case 91. Under the open-loop system of FIG. 9, a cooling medium, preferably fluid, flows through an inlet 92 of a conduit, such as a tube, imbedded in sensor 90. Preferably, the tube is insulated before it enters sensor 90 to reduce heat transfer to the fluid before it reaches sensor 90. The illustrated tube has a serpentine path around coil 1 to maximize heat transfer from the sensor to the cooling fluid, although other suitable paths such as circular, straight or helical paths may be utilized. After heat is collected by the cooling fluid within the sensor, the cooling fluid is exhausted through outlet 94 of the tube. The exhausted cooling fluid is sent to the outer environment with no return path in this illustrated embodiment. It should be appreciated that in this and other embodiments discussed below, that the placement of the tube is not limited to the magnet and coil, and may be configured to wind around one or more additional components within the sensor that require heat relief.

Figure 10:
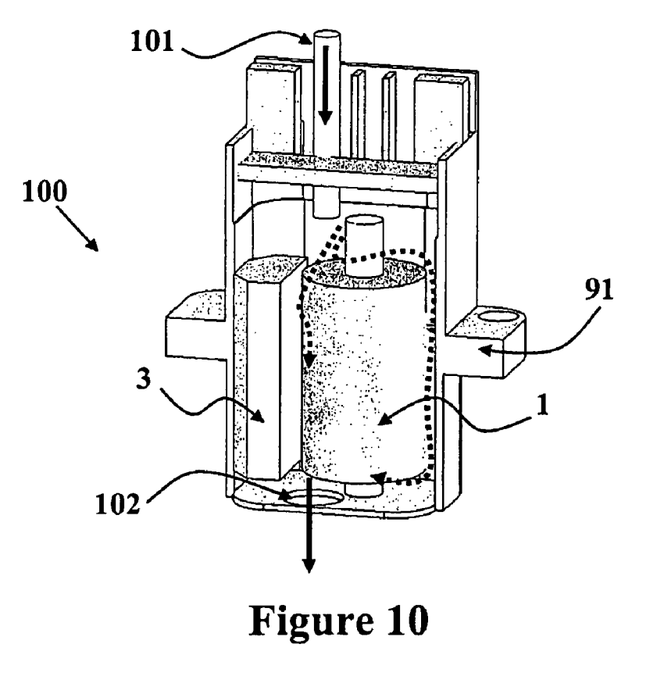
FIG. 10 illustrates a perspective view of a sensor of one exemplary embodiment wherein the sensor has a cooling system illustrated with the front of the case cut away to reveal a magnet, coil and a cooling tube, and where the tube enters the case and terminates, delivering cooling medium to the inside of the case and exhausting through a hole in the sensor case.

FIG. 10 illustrates an alternate embodiment to the embodiment shown in FIG. 9, where open-loop system 100 utilizes inlet tube 101 that terminates within sensor casing 91. Inlet tube 101 opens in sensor case 91, allowing a cooling medium, preferably a suitable gas, to travel around magnet 3 and coil 1 (shown in dotted lines). The gas is exhausted through hole 102 within casing 91. In this embodiment, heat transfer is increased by the turbulent flow of fluid within sensor case 91, and the larger surface area in contact with the cooling medium. It should be understood that the embodiment of FIG. 10 may not be best suited for sensors filled with potting material 6.

Figure 11:
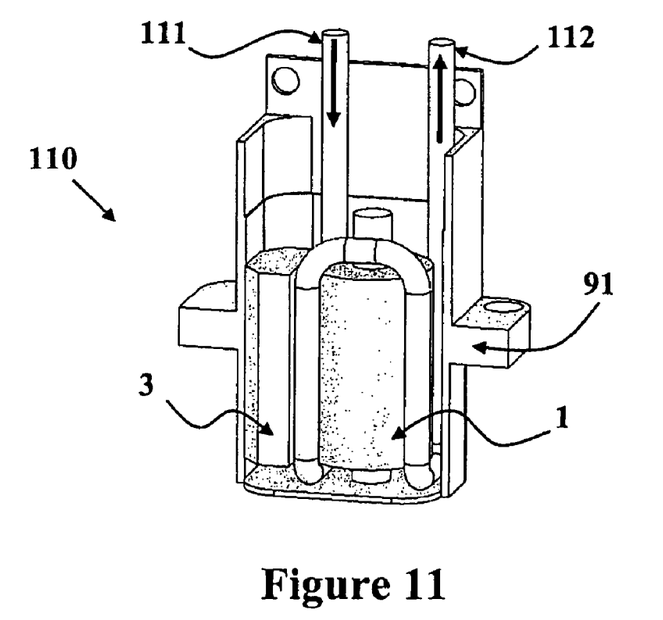
FIG. 11 illustrates a perspective view of a sensor of one exemplary embodiment wherein the sensor has a cooling system illustrated with the front of the case cut away to reveal a magnet, coil and a cooling tube, and wherein the tube takes a serpentine path around the coil and exits the case, without venting fluid to the sensor environment.

Turning now to FIG. 11, a closed loop system 110 is illustrated, where a cooling medium, and preferably a cooling fluid, is introduced via tube inlet 111. The tube carries the fluid travels around magnet 3 and coil 1 situated in sensor case 91, and causes the cooling medium to flow back through tube exit 112. Similar to the embodiment of FIG. 9, after heat is collected within the sensor, the cooling medium or fluid is exhausted and is directed outside casing 91. However, in the embodiment of FIG. 11, the cooling medium remains in the tube. The cooling medium may be recycled or replenished by an external source (not shown), depending on the application intended by the user.

Figure 12:
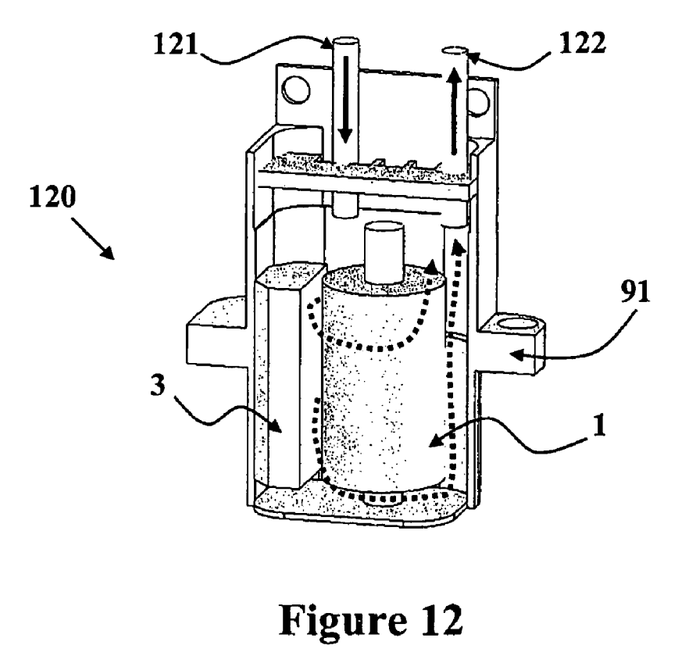
FIG. 12 illustrates a perspective view of a sensor of one exemplary embodiment wherein the sensor has a cooling system illustrated with the front of the case cut away to reveal a magnet, coil and a cooling tube, and wherein the sensor is configured with a closed-loop cooling system wherein cooling fluid is contained in the sensor case.

FIG. 12 illustrates an alternate closed-loop system 120, where a cooling medium enters sensor case 91 via inlet tube 121. The cooling medium flows around magnet 3 and coil 1 (shown in dotted lines) contained within sensor case 91, and is exhausted through exit tube 122. As in FIG. 10, heat transfer is increased by the turbulent flow of fluid within sensor case 91, where a larger surface area is in contact with the cooling medium.

It is understood that any suitable liquid, gas or even a gel may be used as a cooling/heat transfer medium. These include, but are not limited to, water, glycol, oil or fuel, compressed air, engine bleed air or nitrogen.

The above described description and drawings are only to be considered illustrative of exemplary embodiments, which achieve the features and advantages of the invention. Modifications and substitutions to specific process conditions and structures can be made without departing from the spirit and scope of the invention. Accordingly, the invention is not be considered as being limited by the foregoing description and drawings, but is only limited by the scope of the appended claims. All patents and articles cited herein are hereby incorporated by reference in their entirety and relied upon.

What is claimed is:

1. An Eddy Current sensor comprising:
    a permanent magnet and a wire coil adjacent to said permanent magnet, wherein said permanent magnet and said wire coil comprise a sensor;
    a casing housing and configured to position said permanent magnet and wire coil in close proximity to at least one passing rotating blade;
    leads with accessible terminations to facilitate a connection to electronics for monitoring at least one of blade time of arrival measurement and blade tip clearance measurement;
    an inlet, coupled to said casing, wherein the inlet is defined by a tube extending into the casing and arranged to allow a cooling medium to enter inside the casing and travel adjacent to said permanent magnet and to said wire coil; and
    an outlet, coupled to said casing, wherein the outlet is defined by a tube extending out of the casing and arranged to allow the cooling medium to be directed out of said casing.

2. The Eddy Current sensor of claim 1, wherein the inlet and outlet are each insulated.

3. The Eddy Current sensor of claim 1, wherein the casing is insulated.

4. The Eddy Current sensor of claim 1, wherein the cooling medium is one of a liquid, gas and gel.

5. The Eddy Current sensor of claim 1, wherein the inlet and outlet are coupled together through a common conduit, wherein the conduit is arranged within the casing to form a path through which said cooling medium travels around components within the casing.

6. The Eddy Current sensor of claim 5, wherein the conduit is arranged in one of a serpentine path, a circular path, a helical path and a straight path.

7. The Eddy Current sensor of claim 5, wherein the inlet and outlet are arranged as an open-loop system.

8. The Eddy Current sensor of claim 5, wherein the inlet and outlet are arranged as a closed-loop system.

9. The Eddy Current sensor of claim 1, wherein the inlet terminates inside of said casing, allowing the cooling medium to flow freely within said casing.

10. The Eddy Current sensor of claim 9, wherein the inlet and outlet are arranged as a closed-loop system.

11. A method for operating a sensor comprising a permanent magnet and a wire coil placed adjacent to said magnet, the method comprising:
    positioning said permanent magnet and wire coil in close proximity to at least one passing rotor blade;
    monitoring at least one of blade time of arrival measurement and blade tip clearance measurement;
    transferring a cooling medium through an inlet directed into a casing that houses the sensor, wherein the inlet is defined by a tube extending into the casing and arranged to cause the cooling medium to travel adjacent to the permanent magnet and to said wire coil; and
    directing the cooling medium to exit the casing through an outlet directed out of said casing, wherein the outlet is defined by a tube extending out of the casing.

12. The method of claim 11, wherein the cooling medium is one of a liquid, gas and gel.

13. The method of claim 11, which includes a defined path through which the cooling medium flows from the inlet to the outlet.

14. The method of claim 11, wherein the defined path is one of a serpentine path, a circular path, a helical path and a straight path.

15. The method of claim 11, further wherein the inlet and outlet are arranged as an closed-loop system.

16. The method of claim 11, wherein the cooling medium flows freely in at least a portion of said casing.

17. The method of claim 16, wherein the inlet and outlet are arranged as a closed-loop system.

18. An Eddy Current sensor comprising:
a permanent magnet and a wire coil adjacent to said permanent magnet, wherein said permanent magnet and said wire coil comprise a sensor;
a casing housing and configured for positioning said permanent magnet and wire coil in close proximity to at least one passing rotating blade;
leads with accessible terminations to facilitate a connection to electronics for monitoring at least one of blade time of arrival measurement and blade tip clearance measurement;
an inlet, coupled to said casing, wherein the inlet is arranged to allow a cooling medium to enter inside the casing and travel adjacent to the sensor, wherein the inlet is defined by a tube extending into the casing; and
an outlet, coupled to said casing, wherein the outlet is defined by a tube extending out of the casing and is arranged to allow the cooling medium to be directed out of said casing.

19. An Eddy Current sensor comprising:
a permanent magnet and a wire coil adjacent to said permanent magnet, wherein said permanent magnet and said wire coil comprise a sensor;
a casing housing and configured for positioning said permanent magnet and wire coil in close proximity to at least one passing rotating blade;
leads with accessible terminations to facilitate a connection to electronics for monitoring at least one of blade time of arrival measurement and blade tip clearance measurement;
an inlet, coupled to said casing, wherein the inlet is arranged to allow a cooling medium to enter inside the casing and travel adjacent to the sensor, wherein the cooling medium is one of a liquid and gel; and
an outlet, coupled to said casing, wherein the outlet is arranged to allow the cooling medium to be directed out of said casing.

20. An Eddy Current sensor comprising:
a permanent magnet and a wire coil adjacent to said permanent magnet, wherein said permanent magnet and said wire coil comprise a sensor;
a casing housing and configured for positioning said permanent magnet and wire coil in close proximity to at least one passing rotating blade;
leads with accessible terminations to facilitate a connection to electronics for monitoring at least one of blade time of arrival measurement and blade tip clearance measurement;
an inlet, coupled to said casing, wherein the inlet is arranged to allow a cooling medium to enter inside the casing and travel adjacent to the sensor; and
an outlet, coupled to said casing, wherein the outlet is arranged to allow the cooling medium to be directed out of said casing, wherein the inlet and outlet are coupled together through a common conduit, wherein the conduit is arranged within the casing to form a path through which said cooling medium travels around components within the casing, and wherein the inlet and outlet are arranged as a closed-loop system.

21. An Eddy Current sensor comprising:
a permanent magnet and a wire coil adjacent to said permanent magnet, wherein said permanent magnet and said wire coil comprise a sensor;
a casing housing and configured for positioning said permanent magnet and wire coil in close proximity to at least one passing rotating blade;
leads with accessible terminations to facilitate a connection to electronics for monitoring at least one of blade time of arrival measurement and blade tip clearance measurement;
an inlet, coupled to said casing, wherein the inlet is arranged to allow a cooling medium to enter inside the casing and travel adjacent to the sensor and wherein the inlet terminates inside of said casing, allowing the cooling medium to flow freely within said casing; and
an outlet, coupled to said casing, wherein the outlet is arranged to allow the cooling medium to be directed out of said casing, wherein the inlet and outlet are arranged as a closed-loop system.

22. A method for operating a sensor comprising a permanent magnet and a wire coil placed adjacent to said magnet, the method comprising:
positioning said sensor in close proximity to at least one passing rotor blade;
monitoring at least one of blade time of arrival measurement and blade tip clearance measurement;
transferring a cooling medium through an inlet directed into a casing that houses the sensor, wherein the inlet is arranged to cause the cooling medium to travel adjacent to the sensor, wherein the cooling medium is one of a liquid and gel; and
directing the cooling medium to exit the casing through an outlet directed out of said casing.

23. A method for operating a sensor comprising a permanent magnet and a wire coil placed adjacent to said magnet, the method comprising:
positioning said sensor in close proximity to at least one passing rotor blade;
monitoring at least one of blade time of arrival measurement and blade tip clearance measurement;
transferring a cooling medium through an inlet directed into a casing that houses the sensor, wherein the inlet is arranged to cause the cooling medium to travel adjacent to the sensor, wherein the inlet and outlet are arranged as an closed-loop system; and
directing the cooling medium to exit the casing through an outlet directed out of said casing.

24. A method for operating a sensor comprising a permanent magnet and a wire coil placed adjacent to said magnet housed in a casing, the method comprising:
positioning said permanent magnet and wire coil in close proximity to at least one passing rotor blade, wherein a metallic shield is positioned between the sensor and the at least one passing rotating blade;
monitoring at least one of blade time of arrival measurement and blade tip clearance measurement;
transferring a cooling medium through an inlet directed into the casing, wherein the inlet is arranged to cause the cooling medium to travel at least partially between the permanent magnet and to the wire coil; and
directing the cooling medium to exit the casing through an outlet directed out of said casing.

25. An Eddy Current sensor comprising:
a single permanent magnet and a single wire coil adjacent to said permanent magnet, wherein said permanent magnet and said wire coil comprise a sensor;
a casing housing and configured for positioning said sensor in close proximity to at least one passing rotating blade, wherein the sensor is oriented such that said at least one passing rotating blade passes said permanent magnet before passing said coil;

leads with accessible terminations to facilitate a connection to electronics for monitoring at least one of blade time of arrival measurement and blade tip clearance measurement; and a cooling system coupled to said casing and arranged to allow a cooling medium to reduce a temperature of the sensor.

26. The Eddy Current sensor of claim 25, wherein the cooling medium travels adjacent to said permanent magnet and wire coil.

27. The Eddy Current sensor of claim 25, wherein the cooling medium travels at least partially between said permanent magnet and wire coil.

28. The Eddy Current sensor of claim 25, wherein the cooling system includes an inlet, coupled to said casing, wherein the inlet is arranged to allow the cooling medium to enter inside the casing.

29. The Eddy Current sensor of claim 25, wherein the cooling system includes an outlet, coupled to said casing, wherein the outlet is arranged to allow the cooling medium to be directed out of the casing.

30. The Eddy Current sensor of claim 25, wherein the cooling medium is one of a liquid, gas and gel.

31. The Eddy Current sensor of claim 25, further comprising a metallic shield positioned between the sensor and the at least one passing rotating blade.

32. The Eddy Current sensor of claim 25, further comprising a thermocouple wire coupled to the wire coil to detect temperature.

33. An Eddy Current sensor comprising:

a permanent magnet and a wire coil adjacent to said permanent magnet, wherein said permanent magnet and said wire coil comprise a sensor;

a casing housing and configured for positioning said permanent magnet and wire coil in close proximity to at least one passing rotating blade;

leads with accessible terminations to facilitate a connection to electronics for monitoring at least one of blade time of arrival measurement and blade tip clearance measurement;

an inlet, coupled to said casing, wherein the inlet is arranged to allow a cooling medium to enter inside the casing and travel adjacent to said permanent magnet and to said wire coil; and an outlet, coupled to said casing, wherein the outlet is arranged to allow the cooling medium to be directed out of said casing, wherein the inlet and outlet are coupled together through a common conduit, wherein the conduit is arranged within the casing to form a path through which said cooling medium travels around components within the casing, and wherein the inlet and outlet are arranged as a closed-loop system.

34. An Eddy Current sensor comprising:

a permanent magnet and a wire coil adjacent to said permanent magnet, wherein said permanent magnet and said wire coil comprise a sensor;

a casing housing and configured for positioning said permanent magnet and wire coil in close proximity to at least one passing rotating blade;

leads with accessible terminations to facilitate a connection to electronics for monitoring at least one of blade time of arrival measurement and blade tip clearance measurement;

an inlet, coupled to said casing, wherein the inlet is arranged to allow a cooling medium to enter inside the casing and travel adjacent to said permanent magnet and to said wire coil and wherein the inlet terminates inside of said casing, allowing the cooling medium to flow freely within said casing; and an outlet, coupled to said casing, wherein the outlet is arranged to allow the cooling medium to be directed out of said casing, wherein the inlet and outlet are arranged as a closed-loop system.

35. A method for operating a sensor comprising a permanent magnet and a wire coil placed adjacent to said magnet, the method comprising:

positioning said permanent magnet and wire coil in close proximity to at least one passing rotor blade;

monitoring at least one of blade time of arrival measurement and blade tip clearance measurement;

transferring a cooling medium through an inlet directed into a casing that houses the sensor, wherein the inlet is arranged to cause the cooling medium to travel adjacent to the permanent magnet and to said wire coil; and directing the cooling medium to exit the casing through an outlet directed out of said casing, wherein the inlet and outlet are arranged as a closed-loop system.

36. A method for operating a sensor comprising a permanent magnet and a wire coil placed adjacent to said magnet, the method comprising:

positioning said permanent magnet and wire coil in close proximity to at least one passing rotor blade;

monitoring at least one of blade time of arrival measurement and blade tip clearance measurement;

transferring a cooling medium through an inlet directed into a casing that houses the sensor, wherein the cooling medium flows freely in at least a portion of said casing and wherein the inlet is arranged to cause the cooling medium to travel adjacent to the permanent magnet and to said wire coil; and directing the cooling medium to exit the casing through an outlet directed out of said casing, wherein the inlet and outlet are arranged as a closed-loop system.

* * * * *